United States Patent
Bandyopadhyay et al.

(10) Patent No.: US 6,751,990 B2
(45) Date of Patent: Jun. 22, 2004

(54) PROCESS FOR MAKING RARE EARTH DOPED OPTICAL FIBER

(75) Inventors: Tarun Bandyopadhyay, Calcutta (IN); Ranjan Sen, Calcutta (IN); Shyamal Kumar Bhadra, Calcutta (IN); Kamal Dasgupta, Calcutta (IN); Mukul Chandra Paul, Calcutta (IN)

(73) Assignee: Council of Scientific and Industrial Research, New Delhi (IN)

( * ) Notice: Subject to any disclaimer, the term of this patent is extended or adjusted under 35 U.S.C. 154(b) by 196 days.

(21) Appl. No.: 09/800,291

(22) Filed: Mar. 6, 2001

(65) Prior Publication Data

US 2002/0124601 A1 Sep. 12, 2002

(51) Int. Cl.⁷ .............................................. C03B 37/018
(52) U.S. Cl. ............................. 65/378; 65/390; 65/397; 65/398; 65/399; 65/417; 65/419
(58) Field of Search .......................... 65/378, 390, 397, 65/398, 399, 417, 419

(56) References Cited

U.S. PATENT DOCUMENTS

| | | | |
|---|---|---|---|
| 5,005,175 A | | 4/1991 | Desurvire et al. ............. 372/6 |
| 5,058,976 A | * | 10/1991 | DiGiovanni et al. |
| 5,123,940 A | * | 6/1992 | DiGiovanni et al. .......... 65/395 |
| 5,151,117 A | * | 9/1992 | Bartholomew et al. ....... 65/399 |
| 5,474,588 A | | 12/1995 | Tanaka et al. ................ 65/390 |
| 5,491,581 A | | 2/1996 | Roba ........................... 359/341 |
| 5,778,129 A | | 7/1998 | Shukunami et al. ......... 385/127 |
| 6,125,659 A | * | 10/2000 | Yang |
| 6,178,780 B1 | * | 1/2001 | Morita ......................... 65/395 |

OTHER PUBLICATIONS

Merriam Webster's Collegiate Dictionary, Tenth Edition, p. 579.*

* cited by examiner

*Primary Examiner*—John Hoffmann
(74) *Attorney, Agent, or Firm*—Ohlandt, Greeley, Ruggiero & Perle, LLP

(57) ABSTRACT

The present invention provides an improved process for making rare earth doped preforms and fibers by a combination of MCVD technique and solution doping method, said method comprising developing matched or depressed clad structure inside a silica glass substrate tube followed by deposition of unsintered particulate layer containing $GeO_2$ and $P_2O_5$ for formation of the core and solution doping by soaking the porous soot layer into an alcoholic/aqueous solution of RE-salts containing co-dopants like $AlCl_3$/Al$(NO_3)_3$ in definite proportion, controlling the porosity of the soot, dipping period, strength of the solution and the proportion of the codopants to achieve the desired RE ion concentration in the core and minimize the core clad boundary defects and followed by drying, oxidation, dehydration and sintering of the RE containing porous deposit and collapsing at a high temperature to produce the preform and overcladding with silica tubes of suitable dimensions and fiber drawing to produce fibers.

46 Claims, 2 Drawing Sheets

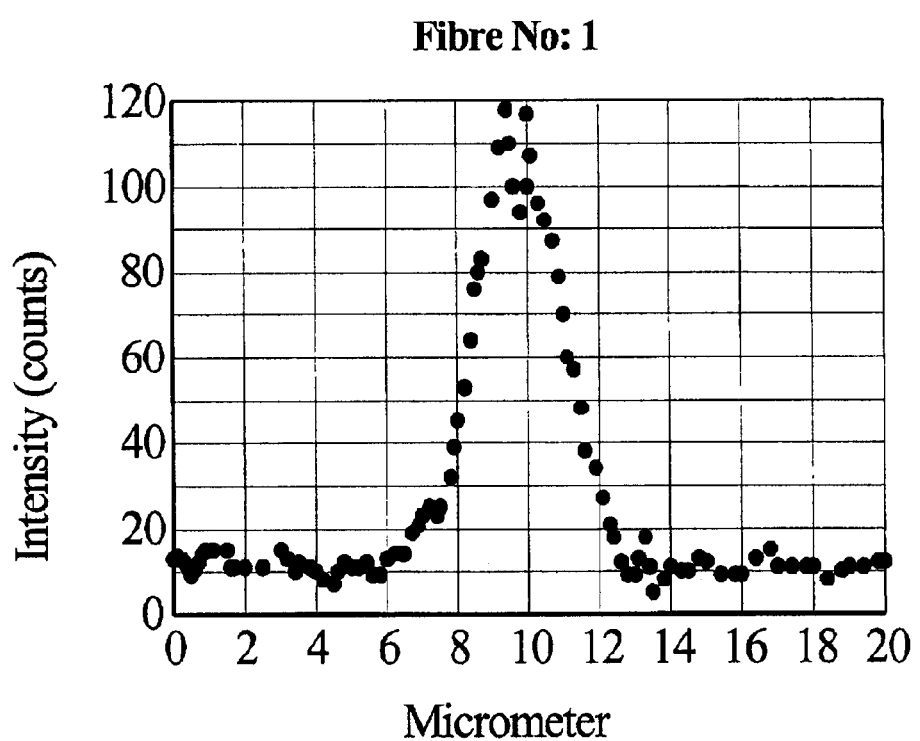
Fig. 1: Er fluorescence distribution across the fibre core.

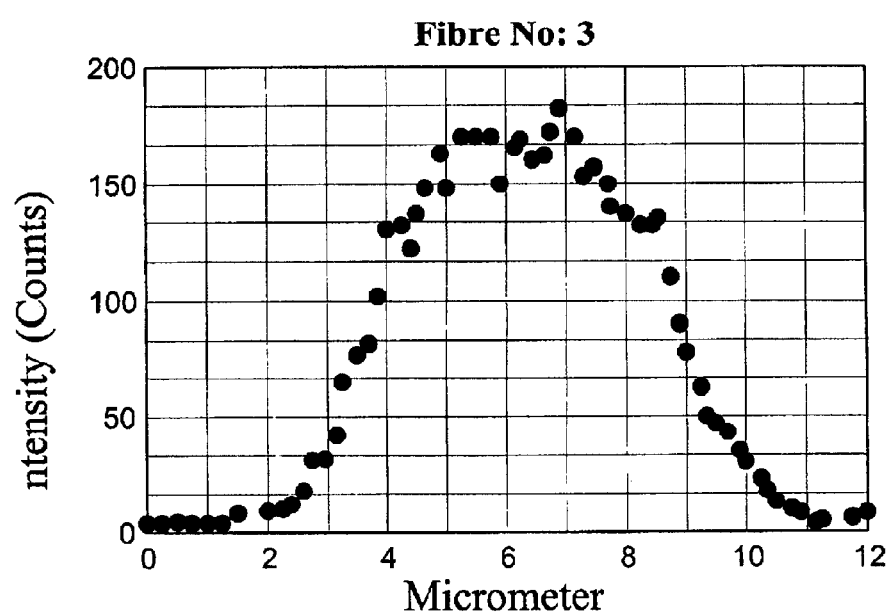
Fig. 2: Er fluorescence distribution across the fibre core.

PROCESS FOR MAKING RARE EARTH DOPED OPTICAL FIBER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a Process for Making Rare Earth Doped Optical Fiber.

2. Description of the Related Art

Rare-earth (RE) doped optical fibers have shown great potential for a number of applications including amplifiers, fiber lasers and sensors. Oxides of rare earths are doped into the core of such fibers as the active substance. Lasing and amplification have been demonstrated at several wavelengths with the incorporation of various rare-earths but for telecommunication applications erbium doped fiber (EDF) remains the most important since the operating wavelength matches with the third low loss optical window.

Erbium doped fiber amplifier (EDFA) operating around 1.53 $\mu$m low loss window is playing the key role in the present day high capacity communication systems. It is able to amplify the optical signal directly independent of modulation format. Optoelectronic repeaters so long used in these systems were 3R devices with the limitations of amplifying the signal in discrete wavelengths. EDFA has the capability to amplify simultaneous optical channels in a single fiber, which has enabled the implementation of WDM (wavelength division multiplexing) technology with the potential of increasing the bandwidth of long distance transmission systems from Gb/s to Tb/s ranges. It thus exhibits high gain, large bandwidth, low noise, polarization insensitive gain, substantially reduced cross talk problems and low insertion losses at the operating wavelengths. The success of future high capacity optical networking and transmission systems will depend significantly on the development of efficient EDFA.

Reference may be made to Townsend J. E., Poole S. B., and Payne D. N., Electronics Letters, Vol. 23 (1987) p-329, 'Solution-doping technique for fabrication of rare-earth-doped optical fiber' wherein, the MCVD process is used to fabricate the preform with a step index profile and desired core-clad structure while solution doping is adopted for incorporation of the active ion. The steps involved in the process are as follows:

i. A conventional cladding doped with $P_2O_5$ and F is deposited within a high silica glass substrate tube to develop matched clad or depressed clad type structure.

ii. The core layers of predetermined composition containing index-raising dopant like $GeO_2$ are deposited at a lower temperature to form unsintered porous soot.

iii. The tube with the deposit is immersed into an aqueous solution of the dopant precursor (typical concentration 0.1 M) up to 1 hour. Any soluble form of the dopant ion is suitable for preparation of the solution although rare earth halides have been mostly used.

iv. Following immersion, the tube is rinsed with acetone and remounted on lathe.

v. The core layer containing the RE is dehydrated and sintered to produce a clear glassy layer. Dehydration is carried out a temperature of 600° C. by using chlorine. The level of OH⁻ is reduced below 1 ppm using $Cl_2/O_2$ ratio of 5:2 provided the drying time exceeds 30 min.

vi. Collapsing in the usual manner to produce a solid glass rod called preform.

vii. Fiber drawing is conventional.

Reference may also be made to DiGiovanni D. J., SPIE Vol. 1373 (1990) p-2 "Fabrication of rare-earth-doped optical fiber" wherein the substrate tube with the porous core layer is soaked in an aqueous or alcoholic solution containing a nitrate or chloride of the desired RE ion. The tube is drained, dried and remounted on lathe. The dehydration is carried out by flowing dry chlorine through the tube at about 900° C. for an hour. After dehydration, the layer is sintered and the tube is collapsed to be drawn to fiber.

Another reference may be made to Ainslie B. J., Craig S. P., Davey S. T., and Wakefield B., Material Letters, Vol. 6, (1988) p-139, "The fabrication, assessment and optical properties of high-concentration $Nd^{3+}$ and $Er^{3+}$ doped silica based fibers" wherein optical fibers based on $Al_2O_3$—$P_2O_5$.—$SiO_2$ host glass doped with high concentrations of $Nd^{3+}$ and $Er^{3+}$ have been fabricated by solution method and quantified. Following the deposition of cladding layers $P_2O_5$ doped silica soot is deposited at lower temperature. The prepared tubes are soaked in an alcoholic solution of 1M $Al(NO_3)_3$+various concentrations of $ErCl_3$ and $NdCl_3$ for 1 hour. The tubes are subsequently blown dry and collapsed to make preforms in the usual way. Al is said to be a key component in producing high RE concentrations in the core centre without clustering effect. It is further disclosed that Al and RE profile lock together in some way, which retards the volatility of RE ion. The dip at the core centre is observed both for P and $GeO_2$.

Reference may also be made to U.S. Pat. No. 5,005,175 (1991) by Desuvire et al., 'Erbium doped fiber amplifier" wherein the fiber for the optical amplifier comprises a single mode fiber doped with erbium in the core having a distribution profile of the RE ion whose radius is less than 1.9 $\mu$m while the radius of the mode of the pump signal exceeds 3 $\mu$m. The numerical aperture (NA) of the fibers varies from 0.2 to 0.35 and the core is doped with both Al and Ge oxides to increase the efficiency. As the radius of the Er doped core region is equal to or less than the radius of the pump mode of the fiber it is claimed that each atom of erbium in the core cross section is exposed to substantially equal levels of the high intensity portion of the pump mode. The fiber with such design is reported to have increased gain and lower threshold compared to the conventional Er doped fiber amplifiers where the radius of the Er doped core is large compared to the radius of the pump mode so that the erbium atoms at the edge of the core do not see a sufficient flux of the pump photons to yield a net gain.

According to U.S. Pat. No. 5,491,581 (1996) by G. S. Roba, 'Rare earth doped optical fiber amplifiers' wherein high germania concentration in the core used to enhance the NA of the fiber is reported to result in generation of residual stress at the core-clad interface due to difference in viscosity and thermal expansion coefficient. Residual stress in turn is believed to produce undesirable increase in background loss of the fiber.

According to U.S. Pat. No. 5,778,129 (1998) by Shukunami et. al., 'Doped optical fiber having core and clad structure are used for increasing the amplification band of an optical amplifier using the optical fiber' wherein the porous core layer is deposited after developing the cladding inside a quartz tube by MCVD process and solution doping method is employed to impregnate Er as the active ion into the porous core to be followed by vitrification and collapsing for making the preform. The solution also contains compound of Al, say chlorides, for codoping of the core with Al in order to expand the amplification band. The Er and Al doped glass constitutes first region of the core. Surrounding this are the second and third regions of the core. The third region contains Ge to increase the refractive index. The second region has an impurity concentration lower than both those of first and third regions and consequently low RI also. The second region acts as a barrier to prevent diffusion of the active dopant.

Reference may also be made to U.S. Pat. No. 5,474,588 (1995) by Tanaka, D. et. al., 'Solution doping of a silica with erbium, aluminum and phosphorus to form an optical fiber' wherein a manufacturing method for Er doped silica is described in which silica glass soot is deposited on a seed rod (VAD apparatus) to form a porous soot preform, dipping the said preform into an ethanol solution containing an erbium compound, an aluminum compound and a phosphoric ester, and desiccating said preform to form Er, Al and P containing soot preform. The desiccation is carried out for a period of 24–240 hours at a temperature of 60°–70° C. in an atmosphere of nitrogen gas or inert gas. This desiccated soot preform is heated and dehydrated for a period of 2.5–3.5 hours at a temperature of 950°–1050° C. in an atmosphere of helium gas containing 0.25 to 0.35% chlorine gas and further heated for a period of 3–5 hours at a temperature of 1400°–1600° C. to render it transparent, thereby forming an erbium doped glass preform. The segregation of $AlCl_3$ in the preform formation process is suppressed due to the presence of phosphorus and as a result the doping concentration of Al ions can be set to a high level (>3 wt %). The dopant concentration and component ratio of Er, Al and P ions are claimed to be extremely accurate and homogeneous in the radial as well as in longitudinal directions.

A few of the drawbacks of the above mentioned processes are as follows:
1. Step like RE distribution profile is obtained in the core resulting to poor overlap between the pump signal and the RE ions which lowers the pump efficiency.
2. Step like RE distribution requires high numerical aperture (NA) of the core or confinement of the RE in the central region (say 50% of the total core area) for increase in pump efficiency which in turn leads to the following disadvantages:
   i) Doping of RE only in selected portion of the core is extremely difficult and affects the repeatability of the process due to the sensitivity of the method to process parameters during various stages of processing such as deposition, solution doping, drying and sintering.
   ii) Increasing the NA of the fiber with simultaneously reducing the core area requires high germania concentration in a small core which enhances the possibility of formation of the dip at the centre due to evaporation during sintering & collapsing.
   iii) For preforms with high NA (>0.20) high germania concentration in the core lowers the viscosity of the glass and makes the process very sensitive to temperature especially during the stages of porous soot layer deposition and sintering.
   iv) Increase in temperature sensitivity during porous soot deposition leads to variation in composition and soot density along the length of the tube.
   v) High germania concentration in the core results to generation of residual stress at the core-clad interface due to difference in viscosity and thermal expansion coefficient. Residual stress produces undesirable increase in background loss of the fiber.
   vi) Residual stress is believed to introduce polarization mode dispersion (PMD) which results in serious capacity impairments including pulse broadening. Since the magnitude of PMD at a given wavelength is not stable passive compensation becomes impossible.
3. Dehydration and sintering of the RE chloride containing soot layer is critical because it alters the composition by vaporization and also diffusion of the dopant salt as well as $GeO_2$ present in the core.

The main object of the present invention is to provide a process for making Rare Earth doped optical fiber, which obviates the drawbacks as detailed above. Another object of the present invention is to provide fibers possessing controlled distribution of RE, more particularly Erbium in the doped region similar to the pump beam intensity distribution in the fiber with maximum concentration at the centre so that the overlapping between the two is considerably improved.

Still another object of the present invention is to provide fibers in which the pump beam has a radius of distribution equal to or greater than the radius of distribution of RE ions in the core to increase the chances of all the active ions getting exposed to the pump light, consequently increasing the pump conversion efficiency in the fiber.

Yet another object of the present invention is to provide a method of controlling the Gaussian RE distribution profile along the radial direction in the core.

Still another object of the present invention is to achieve high optical gain in the fibers for NA value close to 0.20 only thus avoiding wide variation in composition between the core and cladding glass to eliminate problems like residual stress and PMD.

Yet another object of the present invention is to develop erbium doped fibers suitable for amplification of the input signal with NA and mode field diameter not widely different from signal transmitting fiber for ease of splice.

Still another object of the present invention is to reduce the possibility of change in composition of the particulate core layer due to evaporation of the RE salt during drying and sintering.

Yet another object of the present invention is to reduce the quantity of germanium halide required to achieve the desired NA in the fiber.

One more object of the present invention is to provide a process where the numerical aperture of the fiber is varied from 0.10 to 0.30 maintaining RE concentration in the core between 50 to 6000 ppm along with variation in RE distribution profile in the doped region to produce fibers suitable for application as amplifiers, fiber lasers and sensors for different purposes.

SUMMARY OF THE INVENTION

The novelty of the present invention lies in controlling the concentration profile of RE ion in the collapsed preform by minimizing evaporation of the RE salt and also preventing diffusion of the rare earth ion due to subsequent heat treatment. The optimum soot density to achieve this objective is estimated to lie between 0.3 to 0.5 after deposition. The inventive step lies in transformation of the RE salts to oxides by gradually heating the tube to a higher temperature maintaining an oxidizing atmosphere inside, thereby minimizing the possibility of evaporation of RE during subsequent processing as the oxide has a very high melting temperature compared to halide/nitrate salts. This step also helps to remove the solvent trapped within the porous layer. The inventive step also includes increasing the temperature of the RE containing porous layer gradually in steps of 50 to 200° C. up to the sintering temperature and above for sintering and further fixing of the RE ions in their desired sites. The steps will depend on the host glass composition and Er/Al concentration of the core layer. The incorporation efficiency of the RE from the solution to the core layer thus increases appreciably making the process more efficient and economic. The RE distribution along the transverse direction in the core will depend on the density of the porous soot layer, dipping period and the processing conditions during oxidation, sintering and collapsing.

The sintering of the porous core layer in $GeO_2$ rich atmosphere along with the addition of oxygen and helium is another inventive step of the process which reduces the quantity of $GeCl_4$ required to achieve the desired NA and adds to the economy of the process. At temperatures between 200° to 1400° C. during the sintering step pure $GeCl_4$ is supplied with the input oxygen, the quantity of which depends on the NA desired in the fiber. The sintering is continued by gradually raising the temperature till a clear glassy layer is formed.

BRIEF DESCRIPTION OF THE DRAWINGS

FIGS. 1 & 2 represents Er fluorescence distribution across the fiber core

DETAILED DESCRIPTION OF INVENTION

Accordingly the present invention provides an improved process for making rare earth doped optical fiber which comprises (a) providing deposition of $P_2O_5$ and F doped synthetic cladding within a silica glass substrate tube to obtain matched or depressed clad type structure, (b) forming a core by depositing unsintered particulate layer at a tube surface temperature in the range of 1200–1400° C., (c) maintaining $P_2O_5$ and $GeO_2$ concentrations from 0.5 to 5.0 mol % and 3.0 to 25.0 mol % in the said particulate layer respectively to obtain a tube containing F-doped cladding and porous soot layer, (d) immersing the tube containing the porous soot layer into a solution containing RE salt in the concentration range of 0.002 M to 0.25 M with or without aluminum salt of the concentration range 0.05 M to 1.25 M for a period of 1 to 2 hours, (e) draining the solution out at a rate in the range of 10–50 cc/min, (f) drying the porous layer by flowing dry nitrogen or any other inert gas through the tube, (g) heating the tube gradually in the presence of oxygen at a temperature in the range of 600–1100° C., (h) dehydrating the core layer of the tube at a temperature in the range of 800–1200° C. and in presence of excess $Cl_2$, (i) sintering the core layer in the presence of a mixture of oxygen and helium in the temperature range of 1400 to 1900° C., k) collapsing the tube at a temperature in the range of 2000–2300° C. to obtain a preform, (k) overcladding the preform with silica tube, (l) drawing fibers from the preform.

The present invention further provides an process for making erbium doped optical fiber which comprises (a) providing deposition of $P_2O_5$ and F doped synthetic cladding within a silica glass substrate tube to obtain matched or depressed clad type structure, (b) forming a core by depositing unsintered particulate layer at a tube surface temperature in the range of 1200–1350° C., (c) maintaining $P_2O_5$ and $GeO_2$ concentrations from 0.5 to 3.5 mol % and 3.0 to 20.0 mol % in the said particulate layer respectively to obtain a tube containing F-doped cladding and porous soot layer, (d) immersing the tube containing the porous soot layer into a solution containing Er salt in the concentration range of 0.004M to 0.20 M with or without aluminum salt at the concentration range of 0.05 M to 1.0 M for a period of 1 to 2 hours, (e) draining the solution out at a rate in the range of 10–30 cc/min, (f) drying the porous layer by flowing dry nitrogen through or any other inert gas the tube, (g) heating the tube gradually in the presence of oxygen in the temperature range of 700–1000° C., (h) dehydrating the core layer of the tube at a temperature in the range of 800–1200° C. and in presence of excess $Cl_2$, (i) sintering the core layer in the presence of a mixture of oxygen and helium in the temperature range of 1400 to 1800° C., (j) collapsing the tube at a temperature in the range of 2000–2300° C. to obtain a preform, (k) overcladding the preform with silica tube, and (l) drawing fibers from the preform.

The present invention also provides an process for making rare earth doped optical fiber wherein the RE distribution along the transverse direction in the core is varied by controlling the density of the porous soot layer, dipping period and the processing conditions during oxidation, sintering and collapsing depending on the host glass composition and RE/Al concentration of the core layer. The numerical aperture of the fiber is varied from 0.10 to 0.30 maintaining RE concentration in the core between 50 to 6000 ppm along with variation in RE distribution profile along the radial direction in the doped region to produce fibers suitable for application as amplifiers, fiber lasers and sensors for different purposes.

In an embodiment of the present invention, theoretically estimated relative density of the porous soot ranges between 0.30 to 0.50 to avoid core-clad interface defect.

In another embodiment of the present invention $GeCl_4$ supplied during soot deposition is 10 to 30% less than that required for achieving the desired NA numerical aperture.

In another embodiment of the invention, the pump beam has a radius of distribution equal to or greater than the radius of distribution of Er ions in the core, which enhances the chance of all the active ions getting exposed to the pump light.

In another embodiment of the invention, relatively high gain is achieved in the fibers for NA (Numerical aperture) value close to 0.20.

In yet another embodiment of the present invention RE salt used is selected from chloride, nitrate or any other salt soluble in solvent used in the process.

In still another embodiment of the present invention aluminum salt used is selected from chloride, nitrate or any other salt soluble in solvent used in the process.

In yet another embodiment of the present invention solution for aluminum and RE salts is prepared using solvent selected from alcohol and water.

In still another embodiment of the present invention the temperature of the core layer is increased in steps of 50 to 200° C. during oxidation and sintering depending on the composition and Al/RE concentration of the core layer.

In yet another embodiment of the present invention the mixture of $O_2$ and He is in the range of 3:1 to 9:1.

In still another embodiment of the present invention source of chlorine is selected from $CCl_4$ where Helium is used as carrier gas.

In yet another embodiment of the present invention the proportion of $Cl_2:O_2$ varies from 1.5:1 to 3.5:1 while the dehydration period lies between 1 to 2 hours.

In yet another embodiment of the present invention the porous core is sintered in presence of germania by supplying $GeCl_4$ with the input oxygen at a temperature of 1200° C. to 1400° C. during sintering to facilitate germania incorporation and obtain appropriate numerical aperture.

In yet another embodiment, the process provides variation in the numerical aperture of the fiber from 0.10 to 0.30 maintaining RE concentration in the core between 50 to 6000 ppm along with variation in RE distribution profile along the transverse direction in the doped region to produce fibers suitable for application in any devices.

In yet another embodiment, the devices are amplifiers, fiber lasers and sensors for different purposes where optical fiber is used.

Another embodiment of the invention is a method of controlling the Gaussian RE distribution profile along the radial direction in a core used in the process of making rare earth doped optical fiber wherein, said process comprising the steps of:

a) Depositing $P_2O_5$ and F within a high silica glass substrate tube to make matched clad or depressed clad type structure.

b) Depositing predefined composition of unsintered particulate layer at a temperature of 1200 to 1400° C. for the forming a core, wherein $P_2O_5$ and $GeO_2$ levels in the core vary from 0.5 to 5.0 mol % and 3.0 to 25.0 mol % respectively, and $GeCl_4$ concentration in the gas phase is kept 10 to 30% lower than that required for achieving the desired NA of 0.20.

c) The deposition temperature is dependent on the composition and desired porosity of the soot. A theoretically estimated porosity of 0.3 to 0.5 is found suitable to avoid core-clad interface defect and clustering after dipping and to control the RE distribution in the core with maximum concentration at the centre.

d) Immersing the tube containing the porous soot layer into an alcoholic/aqueous solution of $RECl_3/RE(NO_3)_3$ of strength varying between 0.002 M and 0.25 M with or without the addition of $AlCl_3/Al(NO_3)_3$ in the concentration range 0.05 M to 1.25 M for a period of one to two hours.

e) Draining out the solution slowly at a rate of 10 to 50 cc/min. to avoid imperfection in the porous soot material, particularly at the lower end of the tube.

f) Passing dry nitrogen through the tube for sufficient drying of the porous layer and the tube is remounted on lathe.

g) Repeatedly heating the RE/Al containing particulate layer in the range from 600 to 1100° C. (tube surface temperature), in presence of $O_2$+He wherein the temperature is increased in steps of 50 to 200° C. thus oxidizing the RE/Al chloride or nitrate present in the layer to corresponding oxides, wherein the ratio of $O_2$ & He is varied between 3:1 to 9:1.

h) The particulate core layer containing RE is dehydrated at a temperature between 800° to 1200° C. in presence of excess chlorine. $CCl_4$ is used as the source material for $Cl_2$ and supplied by using Helium as a carrier gas which being a lighter gas diffuses through the small pores and assists in the drying process. The proportion of $Cl_2:O_2$ varies from 1.5:1 to 3.5:1 while the dehydration period lies between 1 to 2 hours.

i) The porous core layer is then sintered in presence of $O_2$ and He by heating the tube to a temperature as high as 1900° C. The temperature is gradually increased in steps of 50 to 200° C. depending on the composition and RE/Al concentration of the core layer from the drying temperature between 800 to 1200° C. mentioned above.

j) At temperatures between 1200° to 1400° C. during sintering pure $GeCl_4$ is supplied with the input oxygen to carry out the sintering of the porous layer in germania rich atmosphere which facilitates germania incorporation. The flow rate of $GeCl_4$ and the number of passes depend on the NA desired in the fiber. The supply of $GeCl_4$ is then stopped and the sintering is continued by gradually raising the temperature till a clear glassy layer is formed.

k) The collapsing is carried out at a high temperature (>2000° C.) in 3 to 4 passes of the burner to produce a solid glass rod called preform.

l) The preform is overcladded with silica tubes of suitable dimensions to achieve the appropriate core—clad dimensions in the ultimate preform/fiber.

m) Fibers are drawn from the preform.

The invention is further explained with the help of following examples, which should not be construed to limit the scope of the invention:

EXAMPLE 1

Deposition of F-doped cladding within a silica tube by MCVD process at a temperature of 1855° C.

Unsintered core deposition at a temperature of 1290° C. The carrier gas flows through the reagent liquids were adjusted to obtain a composition of $SiO_2$=90.2 mol %, $P_2O_5$=1.3 mol % and $GeO_2$=8.5 mol % in the deposited soot layer.

Dipping the tube with the deposited layer in a solution containing 0.025 (M) $ErCl_3$ and 0.15 (M) $Al(NO_3)_3$ $9H_2O$ for 1 hour and draining out the solution slowly.

Drying by maintaining nitrogen gas flow through the tube for 10 min.

Oxidation at temperatures of 725° C., 825° C. and 950° C. with 2 passes of the burner at each temperature maintaining a constant $He/O_2$ ratio of 1:5.

Dehydration was carried out at a temperature of 1010° C. with a $Cl_2:O_2$ ratio of 2.5:1 for a period of 1 hour 15 mins.

The temperature was increased in 4 steps up to 1400° C. $GeCl_4$ was added from this stage with input oxygen with 3 passes between 1200° 1400° C. The tube was further heated to increase the temperature stepwise to 1650° C. for complete sintering of the Er & Al containing porous soot layer. During sintering $O_2$ and He flow was in the ratio of 4.5:1.

The collapsing was done in 3 steps in the usual manner.

Overcladding was done to reduce the core:clad ratio to 3.6:125. The NA measured in the fiber was 0.204±0.01.

The $Er^{3+}$ ion concentration in the fiber was 950 ppm with maximum concentration at the core centre and distribution as shown in FIG. 1 accompanying this specification. The Er distribution in the core was measured from the fiber section by fluorescence spectroscopy by Photonics Resource Facility, 60 St. George Street, Suite No. 331, Toronto, Ontario, Canada M5S 1A7.

The fiber recorded a gain of 35.4 dB. The gain was measured at C-DOT, 39 Main Pusa Road, New Delhi—110 005 using their measurement set-up.

EXAMPLE 2

Deposition of F-doped cladding inside a silica glass tube by MCVD process at a temperature of 1840° C.

Unsintered core deposition at a temperature of 1310° C. The carrier gas flows through the reagent liquids were adjusted to obtain a composition of $SiO_2$=91.6 mol %, $P_2O_5$=1.1 mol % and $GeO_2$=7.3 mol % in the deposited soot layer.

Dipping the tube with the deposited layer in a solution containing 0.015 (M) $ErCl_3$, $6H_2O$ and 0.15 (M) $Al(NO_3)_3$ $9H_2O$ for 1.5 hours and draining out the solution slowly.

Drying by maintaining nitrogen gas flow through the tube for 10 min.

Oxidation at temperatures of 750°, 800° and 900° C. with 2 passes of the burner at each temperature maintaining a constant $He/O_2$ ratio of 1:5.

Dehydration was carried out at a temperature of 915° C. with a $Cl_2:O_2$ ratio of 2.3:1 for a period of one hour.

The temperature was increased in 3 steps up to 1200° C. $GeCl_4$ was added from this stage with input oxygen with one pass each at 1200°, 1300° and 1400° C. The tube was further heated to increase the temperature stepwise to 1610° C. for complete sintering of the Er & Al containing porous soot layer. During sintering $O_2$ and He flow was in the ratio of 5:1.

The collapsing was done in 3 steps in the usual manner.

Overcladding was done to reduce the core:clad ratio to 3.6:125.

The NA measured in the fiber was 0.201±0.01.

The $Er^{3+}$ ion concentration in the fiber was 460 ppm with peak at the core centre and similar distribution as shown in accompanying drawings as FIG. 1.

The fiber recorded a gain up to 37 dB as measured from C-DOT, 39 Main Pusa Road, New Delhi—110 005 using their measurement set-up.

EXAMPLE 3

Deposition of F-doped cladding within a silica tube by MCVD process at a temperature of 1870° C.

Unsintered core deposition at a temperature of 1250° C. The carrier gas flows through the reagent liquids were adjusted to obtain a composition of $SiO_2$=89.1 mol %, $P_2O_5$=2.3 mol % and $GeO_2$=8.6 mol % in the deposited soot layer.

Dipping the tube with the deposited layer in a aqueous solution containing 0.07 (M) $ErCl_3$ and 0.25 (M) $Al(NO_3)_3$ $9H_2O$ for 1 hour and draining out the solution slowly.

Drying by maintaining nitrogen gas flow through the tube for 10 min.

Oxidation at temperatures of 730°, 820°and 925° C. with 2 passes of the burner at each temperature maintaining at constant $He/O_2$ ratio of 1:6.

Dehydration was carried out at a temperature of 925° C. with a $Cl_2:O_2$ ratio is 2.3:1 for a period of 1.5 hour.

The temperature was increased in 4 steps up to 1400° C. $GeCl_4$ was added with the input oxygen with 2 passes at 1200° C. and one pass each at 1300° C. and 1400° C. The tube was further heated to increase the temperature stepwise to 1725° C. for complete sintering of the Er & Al containing porous soot layer. During sintering $O_2$ and He flow was in the ratio of 4:1.

The collapsing was done in 3 steps in the usual manner.

Overcladding was done to reduce the core:clad ratio to 6.5:125. The NA measured in the fiber was 0.22±0.01.

The $Er^{3+}$ ion concentration in the fiber was 3020 ppm with peak concentration at the core centre and Er distribution in the core as shown in accompanying drawing as FIG. 2 measured from the fiber section by fluorescence spectroscopy by Photonics Resource Facility, 60 St. George Street, Suite No. 331, Toronto, Ontario, Canada M5S-1A7.

The main advantages of the present invention are:

1. The developed fibers have a RE distribution in the doped region similar to the Gaussian pump beam intensity distribution in the fiber so that the overlapping between the two is considerably improved consequently increasing the pump conversion efficiency in the fiber.

2. The pump beam has a radius of distribution equal to or greater than the radius of distribution of RE ions in the core, which enhances the chance of all the active ions getting exposed to the pump light.

3. The RE distribution along the transverse direction in the core is varied by controlling the density of the porous soot layer, dipping period and the processing conditions during oxidation, sintering and collapsing depending on the host glass composition and RE/Al concentration of the core layer.

4. The compositions of the core and cladding glass are varied to achieve NA close to 0.20 for $Er^{3+}$ ion concentration in the range of 100 to 1500 ppm in order to provide erbium doped fiber suitable for pumping for amplification of the input signal with gain in the range 10 to 37 dB for optical amplifier application.

5. Wide variation in composition between the core and cladding glass is avoided due to relatively low NA in the RE doped fibers mentioned under 4 above eliminating problems like residual stress and PMD which may substantially degrade the performance of the fibers.

6. The developed fibers mentioned under 4 and 5 above have NA and mode field diameter not widely different from signal transmitting fiber for ease of splice. This minimises the optical loss of the signal travelling through the fibers.

7. Sintering in germania rich atmosphere facilitates incorporation of germania in the core and reduces the quantity of germanium halide necessary during deposition to achieve the desired NA making the process efficient and economic.

8. The oxidation step before drying and sintering of the particulate layer reduces the possibility of change in composition due to evaporation of RE salts during subsequent processing.

9. The stepwise increase in temperature during oxidation and sintering stages prevents diffusion of RE and the codopants minimising the probability of a change in composition.

10. The incorporation efficiency of RE in the doped region is increased due to the reason stated in 8 and 9 above, which adds to the economy of the process.

11. The improvement in process efficiency due to the reasons mentioned in 8–10 above enhances the yield and repeatability of the process.

12. The concentration of RE in the core is varied between 50 to 6000 ppm along with variation in RE distribution profile in the doped region and NA between 0.10 to 0.30 to produce fibers suitable for application as amplifiers, microlasers and sensors for different purposes.

The foregoing disclosure and description of the invention are illustrative and explanatory thereof, and various changes in the details of the illustrated apparatus and construction and method of operation may be made without departing from the spirit of the invention.

What is claimed is:

1. A process for making rare earth (RE) doped optical fibre, said process comprising steps of:
   a) providing deposition of $P_2O_5$ and F doped synthetic cladding within a silica glass substrate tube to obtain matched or depressed clad type structure,
   b) forming a core by depositing unsintered particulate layer at a tube surface temperature in the range of 1200–1400° C.,
   c) maintaining $P_2O_5$ and $GeO_2$ concentrations from 0.5 to 5.0 mol % and 3.0 to 25.0 mol % in the said particulate layer respectively to obtain a tube containing F-doped cladding and porous soot layer,
   d) immersing the tube containing the porous soot layer into a solution containing RE salt in the concentration range of 0.002 M to 0.25 M with or without aluminum salt in the concentration range 0.05 M to 1.25 M for a period of 1 to 2 hours,
   e) draining the solution out at a rate in the range of 10–50 cc/min,
   f) drying the porous layer by flowing dry nitrogen or any other inert gas through the tube,
   g) heating the tube gradually in presence of $O_2$ and He at a temperature ranging between 600–1100° C.,
   h) dehydrating the core layer of the tube at a temperature in the range of about 800–1200° C. and in presence of excess $Cl_2$ and $O_2$ and He,
   i) sintering the core layer in presence of a mixture of oxygen and helium and $GeCl_4$ in the temperature range between 1400 to 1900° C.,
   j) collapsing the tube at a temperature ranging from 2000–2300° C. to obtain a preform,
   k) overcladding the preform with silica tube, and
   l) drawing fibres from the preform.

2. A process as claimed in claim 1 wherein, the theoretically estimated relative density of the porous soot ranges between 0.30 to 0.50 to avoid core-clad interface defect.

3. A process as claimed in claim 1 wherein, the RE salt used is selected from chloride, nitrate or any other salt soluble in solvent used in the process.

4. A process as claimed in claim 1 wherein, the aluminium salt used is selected from chloride, nitrate or any other salt soluble in solvent used in the process.

5. A process as claimed in claim 1 wherein, the solution for aluminium and erbium salt is prepared using solvent selected from alcohol and water.

6. A process as claimed in claim 1 wherein in step (g), $O_2$ and He are present in the range of 3:1 to 9:1.

7. A process as claimed in claim 1 wherein, the source of chlorine is $CCl_4$ where He is used as carrier gas.

8. A process as claimed in claim 1 wherein, the proportion of $Cl_2$: $O_2$ is ranging from 1.5:1 to 3.5:1 while the dehydration period lies between 1 to 2 hours.

9. A process as claimed in claim 1 wherein, during sintering of porous core layer $GeCl_4$ is supplied with the input oxygen maintaining a temperature of 1200° C. to 1400° C.

10. A process as claimed in claim 1 wherein, sintering takes place in a germania rich atmosphere to facilitate higher germania incorporation and reduces the quantity of germanium halide necessary during deposition.

11. A process as claimed in claim 1 wherein, the oxidation step before drying and sintering of the particulate layer reduces the possibility of change in composition due to evaporation of RE salts during subsequent processing.

12. A process as claimed in claim 1 wherein, the increase in temperature in steps of 50 to 200° C. during oxidation and sintering stages prevents diffusion of RE and the codopants from the doped region resulting to minimum change in composition.

13. A process as claimed in claim 1 where the incorporation efficiency of RE in the doped region is increased.

14. A process for producing Er doped fibre in particular characterised by Er ion distribution in the core similar to the Gaussian pump beam intensity distribution wherein, the said process comprising steps of:
   (a) providing deposition of $P_2O_5$ and F doped synthetic cladding within a silica glass substrate tube to obtain matched or depressed clad type structure,
   (b) forming a core by depositing unsintered particulate layer at a tube surface temperature in the range of 1200–1350° C.,
   (c) maintaining $P_2O_5$ and $GeO_2$ concentrations from 0.5 to 3.5 mol % and 3.0 to 20.0 mol % in the said particulate layer respectively to obtain a tube containing F-doped cladding and porous soot layer,
   (d) immersing the tube containing the porous soot layer into a solution containing Er salt in the concentration range of 0.004 M to 0.20 M with or without aluminium salt in the concentration range 0.05 M to 1.0 M for a period of 1 to 2 hours,
   (e) draining the solution out at a rate in the range of 10–30 cc/min,
   (f) drying the porous layer by flowing dry nitrogen or any other inert gas through the tube,
   (g) heating the tube gradually in presence of $O_2$ and He in the temperature range 700–1000° C.,
   (h) dehydrating the core layer of the tube at a temperature in the range of 800–1200° C. and in presence of excess $Cl_2$ and $O_2$ and He,
   (i) sintering the core layer in presence of a mixture of oxygen and helium and $GeCl_4$ in the temperature range of 1400 to 1800° C.,
   (j) collapsing the tube at a temperature in the range of 2000–2300° C. to obtain a preform,
   (k) overcladding the preform with silica tube, and
   (l) drawing fibres from the preform.

15. A process as claimed in claim 14 wherein, the theoretically estimated relative density of the porous soot ranges between 0.30 to 0.50 to avoid core-clad interface defect.

16. A process as claimed in claim 14 wherein, the erbium salt used is selected from chloride, nitrate or any other salt soluble in solvent used in the process.

17. A process as claimed in claim 14 wherein, the aluminium salt used is selected from chloride, nitrate or any other salt soluble in solvent used in the process.

18. A process as claimed in claim 14 wherein, the solutions for aluminium and erbium salts are prepared using solvent selected from alcohol and water.

19. A process as claimed in claim 14 wherein in step (g), $O_2$ and He are present in the range of 4:1 to 9:1.

20. A process as claimed in claim 14 wherein, the source of chlorine is $CCl_4$ where He is used as carrier gas.

21. A process as claimed in claim 14 the proportion of $Cl_2:O_2$ is varying from 1.5:1 to 3.5:1 while the dehydration period lies between 1 to 2 hours.

22. A process as claimed in claim 14 wherein, during sintering of porous core layer $GeCl_4$ is supplied with the input maintaining a temperature of 1200° C. to 1400° C.

23. A process as claimed in 14 wherein, the fibres have a controlled distribution of a rare earth ion in the doped region with maximum concentration at the centre similar to the Gaussian pump beam intensity distribution in the fibre so that the overlapping between the ion distribution and the intensity distribution is considerably improved, consequently increasing the pump conversion efficiency in the fibre.

24. A process as claimed in 14 wherein, said Gaussian pump beam has a radius of distribution equal to or greater than the radius of distribution of Er ions in the core, which enhances the chance of all the active ions getting exposed to the pump light.

25. A process as claimed in 14 wherein, relatively high gain is achieved in the fibres for NA value close to 0.20.

26. A process as claimed in 14 wherein, wide variation in composition between the core and cladding glass is avoided due to relatively low NA of the fibre eliminating problems like residual stress and PMD, which may substantially degrade the performance of the fibre.

27. A process as claimed in 14 wherein, the compositions of the core and cladding glass are suitable to achieve NA of 0.20 and $Er^{3+}$ion concentration in the range of 100 to 1500 ppm without clustering in order to provide EDF suitable for pumping at 980 nm for amplification of the input signal with gain in the range 10 to 37 dB for optical amplifier application.

28. A process as claimed in 14 wherein, the fibres have NA and mode field diameter not widely different from signal transmitting fibre for ease of splice and this minimises the optical loss of the signal travelling through the fibres.

29. A process as claimed in 14 wherein, sintering takes place in a germania rich atmosphere to reduce the quantity of germanium halide necessary during deposition to achieve the desired NA.

30. A process as claimed in 14 wherein, the oxidation step before drying and sintering of the particulate layer reduces the possibility of change in composition due to evaporation of Er salts during subsequent processing.

31. A process as claimed in 14 wherein, the increase in temperature in steps of 50 to 200° C. during oxidation and sintering stages prevents diffusion of Er and the codopants minimising the possibility of change in composition.

32. A process as claimed in 14 wherein, the incorporation efficiency of Er in the doped region is increased which in turn increases the economy and repeatability of the process.

33. A process as claimed in 14 wherein, the numerical aperture of the fibre is varied from 0.10 to 0.30 maintaining Er concentration in the core between 50 to 6000 ppm along with variation in Er distribution profile in the doped region to produce fibres suitable for application as amplifiers, fibre lasers and sensors for different purposes.

34. A method of controlling the Gaussian RE distribution profile along the radial direction in a core used in a process for making rare earth doped optical fibre wherein, the said method comprises the steps of:

a) forming a core by depositing unsintered particulate layer at a tube surface temperature in the range of 1200–1400° C., b) maintaining $P_2O_5$ and $GeO_2$ concentrations from 0.5 to 5.0 mol % and 3.0 to 25.0 mol % in the said particulate layer respectively to obtain a tube containing F-doped cladding and porous soot layer, c) immersing the tube containing the porous soot layer into a solution containing RE salt in the concentration range of 0.002 M to 0.25 M with or without aluminium salt in the concentration range 0.05 M to 1.25 M for a period of 1 to 2 hours, d) draining the solution out at a rate in the range of 10–50 cc/min, e) drying the porous layer by flowing dry nitrogen or any other inert gas through the tube, f) heating the tube gradually in presence of $O_2$ and He in the temperature range 700–1100° C. and increasing the temperature in steps of 50 to 200° C., g) dehydrating the core layer of the tube at a temperature in the range of 800–1200° C. and in presence of excess $Cl_2$ and $O_2$ and He, h) sintering the core layer in presence of a mixture of oxygen and helium and $GeCl_4$ and in the temperature range of 1400 to 1900° C. increasing the temperature in steps of 50 to 200° C., i) collapsing the tube at a temperature in the range of 2000–2300° C. to obtain a preform, and j) drawing fibres from the preform.

35. A process as claimed in claim 34 wherein, the theoretically estimated relative density of the porous soot ranges between 0.30 to 0.50 to avoid core-clad interface defect.

36. A process as claimed in claim 34 wherein, the RE salt used is chloride, nitrate or any other salt soluble in solvent used in the process.

37. A process as claimed in claim 34 wherein, the aluminium salt used is selected from chloride, nitrate or any other salt soluble in solvent used in the process.

38. A process as claimed in claim 34 wherein, the solutions for aluminium and erbium salts are prepared using solvent selected from alcohol and water.

39. A process as claimed in claim 34 wherein in step (g), $O_2$ and He are present in the range of 3:1 to 9:1.

40. A process as claimed in claim 34 wherein, the source of chlorine is $CCl_4$ where He is used as carrier gas.

41. A process as claimed in claim 34 the proportion of $Cl_2:O_2$ is varying from 1.5:1 to 3.5:1 while the dehydration period lies between 1 to 2 hours.

42. A process as claimed in claim 34 wherein, during sintering of porous core layer $GeCl_4$ is supplied with the input oxygen maintaining at a temperature ranging from 1200° C. to 1400° C.

43. A process as claimed in claim 34 wherein, the oxidation step before drying and sintering of the particulate layer reduces the possibility of change in composition due to evaporation of the RE salt during subsequent processing.

44. A process as claimed in claim 34 wherein, the stepwise increase in temperature during oxidation and sintering stages prevents diffusion of RE and the codopants which in turn prevents change in composition.

45. A process as claimed in claim 34 wherein, the numerical aperture of the fibre is varied from 0.10 to 0.30 maintaining RE concentration in the core between 50 to 6000 ppm along with variation in the RE distribution profile in the doped region to produce fibres suitable for any devices.

46. A process as claimed in claim 34, wherein the devices are amplifiers, fibre lasers, and sensors for different purposes and other devices where optical fibre is used.

* * * * *